(12) United States Patent
Lammers et al.

(10) Patent No.: US 10,591,085 B2
(45) Date of Patent: Mar. 17, 2020

(54) ONE-WAY STORAGE BASIN VALVE

(71) Applicant: Ford Global Technologies, LLC, Dearborn, MI (US)

(72) Inventors: Bradley Arnold Lammers, Canton, MI (US); Ahthavan Raja Sureshkumar, LaSalle (CA); Tyler James-Ray Kaldobsky, Westland, MI (US); Robert Joseph Bartz, Detroit, MI (US); Douglas G Hughes, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 258 days.

(21) Appl. No.: 15/672,400

(22) Filed: Aug. 9, 2017

(65) Prior Publication Data
US 2019/0049039 A1 Feb. 14, 2019

(51) Int. Cl.
| | | |
|---|---|---|
| *F16K 41/10* | (2006.01) | |
| *F16K 15/20* | (2006.01) | |
| *F16K 31/06* | (2006.01) | |
| *F16K 15/14* | (2006.01) | |
| *B60K 1/04* | (2019.01) | |
| *H01M 2/36* | (2006.01) | |
| *B60L 53/20* | (2019.01) | |

(52) U.S. Cl.
CPC .......... *F16K 41/103* (2013.01); *F16K 15/148* (2013.01); *F16K 15/202* (2013.01); *F16K 31/0672* (2013.01); *B60K 1/04* (2013.01); *B60L 53/20* (2019.02); *H01M 2/362* (2013.01)

(58) Field of Classification Search
CPC .... F16K 41/103; F16K 15/148; F16K 15/202; F16K 31/0672; B60L 53/20; B60K 1/04; H01M 2/362
USPC .......................................... 137/846
See application file for complete search history.

(56) References Cited

U.S. PATENT DOCUMENTS

| | | | |
|---|---|---|---|
| 3,889,710 A * | 6/1975 | Brost | F16K 15/141 |
| | | | 137/512.15 |
| 3,940,178 A | 2/1976 | Leveque | |
| 5,636,890 A | 6/1997 | Cooper | |
| 6,105,609 A * | 8/2000 | Polidan | F16K 15/141 |
| | | | 137/515.7 |
| 6,299,177 B1 | 10/2001 | Rehberg et al. | |
| 7,118,151 B2 | 10/2006 | Bejin et al. | |
| 8,709,670 B2 | 4/2014 | Niezabytowski et al. | |
| 2014/0020770 A1 | 1/2014 | Son et al. | |
| 2016/0339774 A1 * | 11/2016 | Hayashi | B60K 1/00 |

* cited by examiner

*Primary Examiner* — P. Macade Nichols
(74) *Attorney, Agent, or Firm* — Vichit Chea; Brooks Kushman, P.C.

(57) ABSTRACT

A one-way valve is provided. The one-way valve includes a base having a first ring wall including a first aperture disposed therethrough. The base further includes a second ring wall coaxial with the first ring wall. The second ring wall includes a second aperture disposed therethrough and angularly offset from the first aperture. The base further includes a central arching surface. The one-way valve includes a diaphragm disposed on the central arching surface. The one-way valve further includes a cover secured to the base and defining an annular skirt region. The one-way valve further includes a seal disposed in the annular skirt region.

17 Claims, 4 Drawing Sheets

ONE-WAY STORAGE BASIN VALVE

TECHNICAL FIELD

This disclosure relates to fluid management for hybrid vehicles, and more specifically, to a one-way valve for storage basins having floor-mounted battery components.

BACKGROUND

Electrified vehicles, such as hybrid electric vehicles (HEVs), plug-in hybrid electric vehicles (PHEVs), battery electric vehicles (BEVs), or fuel cell vehicles differ from conventional motor vehicles in that they are powered by electric machines (i.e., electric motors and/or generators) instead of or in addition to an internal combustion engine. High voltage (HV) current for powering these types of electric machines is typically supplied by a high voltage traction battery system. Electrified vehicle battery systems may employ one or more battery modules that include a plurality of battery arrays.

In a vehicle assembly line, a vehicle spare-wheel tub comprised of sheet metal components may be dipped in one or more tubs as part of the painting process. The tub may be first dipped into a phosphate wash which cleans oil off of the assembly and coats it with phosphate, and then into an E-coat bath which acts as a corrosion resistant primer and provides an electrostatic charge on the sheet metal surface for later painting. As the assembly moves into and out of the tubs, the vehicle door assembly will fill with liquids, and large drain slots are provided at the bottom of the door assembly for draining out such liquids. Such drain slots may not desirable after the assembly has been painted.

SUMMARY

In at least one approach, a one-way valve is provided. The one-way valve may include a base having a first ring wall including a first aperture disposed therethrough. The base may further include a second ring wall coaxial with the first ring wall. The second ring wall may include a second aperture disposed therethrough and angularly offset from the first aperture. The base may further include a central arching surface. The one-way valve may include a diaphragm disposed on the central arching surface. The one-way valve may further include a cover secured to the base and defining an annular skirt region. The one-way valve may further include a seal disposed in the annular skirt region.

In at least one approach, a vehicle is provided. The vehicle may include a storage basin disposed in a floor of the vehicle and having a basin floor defining a first surface exposed to an interior of the storage basin and a second surface opposite the first surface exposed to an exterior of the vehicle. The vehicle may further include a high-voltage traction battery disposed within the storage basin and secured to the first surface. The storage basin may include an aperture disposed through the basin floor. The storage basin may further include a one-way valve disposed within the aperture.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
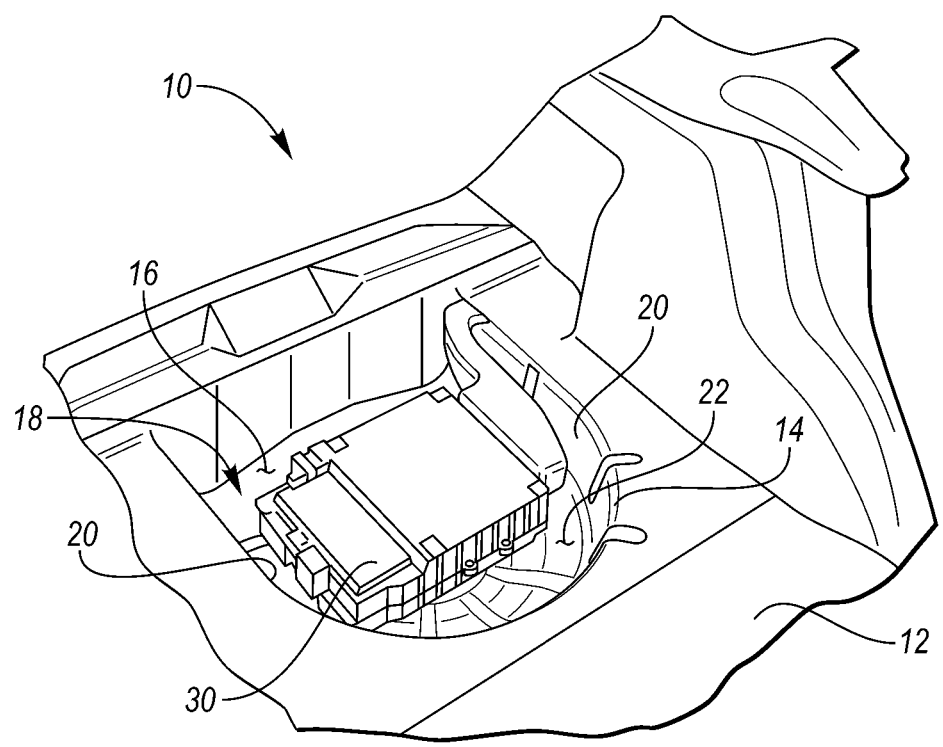
FIG. 1 is top perspective view of a storage basin of a vehicle.

Referring to FIG. 1, a vehicle 10 is provided. The vehicle 10 may be an electrified vehicle. For example, the vehicle 10 may be a hybrid electric vehicle (HEV), a plug-in hybrid electric vehicle (PHEV), a battery electric vehicles (BEV) or a fuel cell vehicle.

The vehicle 10 may include a lower support structure defining a floor 12 of the vehicle. The floor 12 may be, for example, a floor pan formed of sheet metal. A storage basin 14 may be disposed in the floor 12. The storage basin 14 may have a basin floor 16. The basin floor 16 may be the lowermost region of the storage basin 14, and in some approaches, may be the lowermost region of the floor 12. The basin floor 16 may be, for example, a generally horizontal surface extending between generally vertical walls 20 that may define a perimeter of the storage basin 14.

Figure 2:
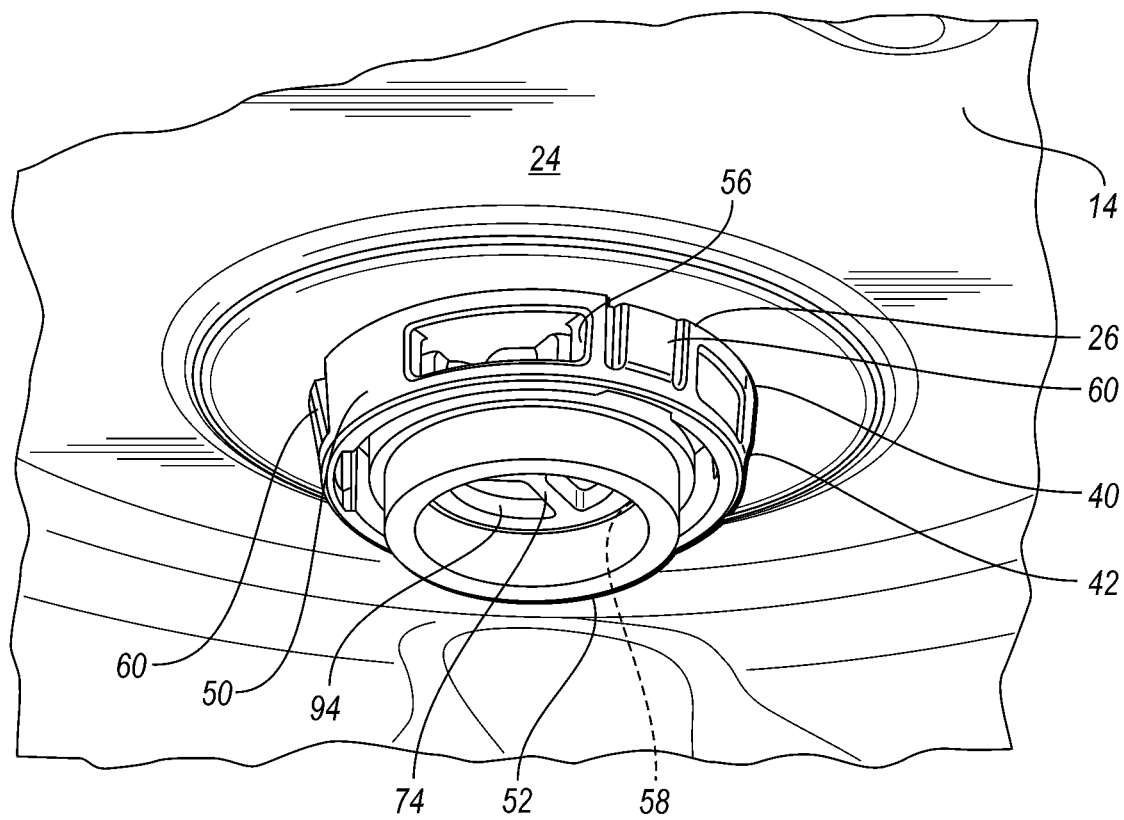
FIG. 2 is a bottom perspective view of a storage basin of a vehicle.

As shown in FIG. 1, the storage basin 14 may define a first surface 22 exposed to an interior of the storage basin 14. Referring momentarily to FIG. 2, the storage basin 14 may also define a second surface 24 opposite the first surface 22 and exposed to an exterior of the vehicle 10. In at least one approach, the first surface 22 may be referred to as a top or upper surface of the basin floor 16, and the second surface 24 may be referred to as a bottom or lower surface of the basin floor 16.

An aperture 26 may be disposed through the basin floor 16 of the storage basin 14. The aperture 26 may have an outer diameter of approximately 40 millimeters. The aperture 26 may be provided to permit drainage of liquids during the initial vehicle assembly process.

The interior of the storage basin 14 may define a cavity 28. The cavity 28 may be defined at a lower region by the basin floor 16 and at end regions by the generally vertical walls 20. A cover (not shown) may be disposed at an upper region of the cavity 28 to cover the cavity 18. In at least one approach, the cover may be a removable cover and may be, for example, a trim panel. In at least one other approach, the cover may be a body metal that is fixedly secured to cover the cavity 18 (e.g., through welding or other permanent or semi-permanent approach).

The cavity 28 may be sized to receive one or more objects. For example, the cavity 28 may be sized to receive a spare tire for the vehicle 10. In this way, the storage basin 14 may take the form of a spare tire tub formed in the floor 12 of the vehicle 10.

In at least one approach, a battery 30 may be disposed within the storage basin 14; for example, between opposing generally vertical walls 20 of the storage basin 14. The battery 30 may be, for example, a high-voltage (e.g., 200+V at 70% state of charge) battery 30 or a high-voltage traction battery. The HV battery 30 may be operable to supply high-voltage power to an electric machine disposed within the vehicle 10. The electric machine may be, for example, a motor or combination motor/generator. The motor may receive power from the HV battery 30 through a high current fuse box (HCFB), and may provide torque to drive one or more pairs of vehicle wheels. The HV battery 30 may be secured to the first surface 22. The HV battery 30 may be mounted on a mounting brace and may be secured to the first surface 22 through one or more brackets.

The HV battery 30 may include battery cells that may be arranged in battery cell arrays within a battery housing. The battery cells, which may be, for example, prismatic cells, may include electrochemical cells that convert stored chemical energy to electrical energy. Prismatic cells may include a can housing, a positive electrode (cathode) and a negative electrode (anode). An electrolyte may allow ions to move between the anode and cathode during discharge, and then return during recharge. The battery cell arrays may be in electrical communication with other vehicle components (e.g., a BEC, BECM, or DC/DC converter unit). For example, terminals may allow current to flow out of the battery cells for use by the vehicle components. When positioned in an array with multiple battery cells, the terminals of each battery cell may be aligned with opposing terminals (positive and negative) adjacent to one another to facilitate a series connection between the multiple battery cells. Other types of HV batteries are expressly contemplated.

The HV battery 30 may be disposed within the storage basin 14 such that it is disposed above the aperture 26 (e.g., vertically above the aperture 26). For example, the HV battery 30 may be disposed such that it intersects a central axis of the aperture 26.

Figure 3:
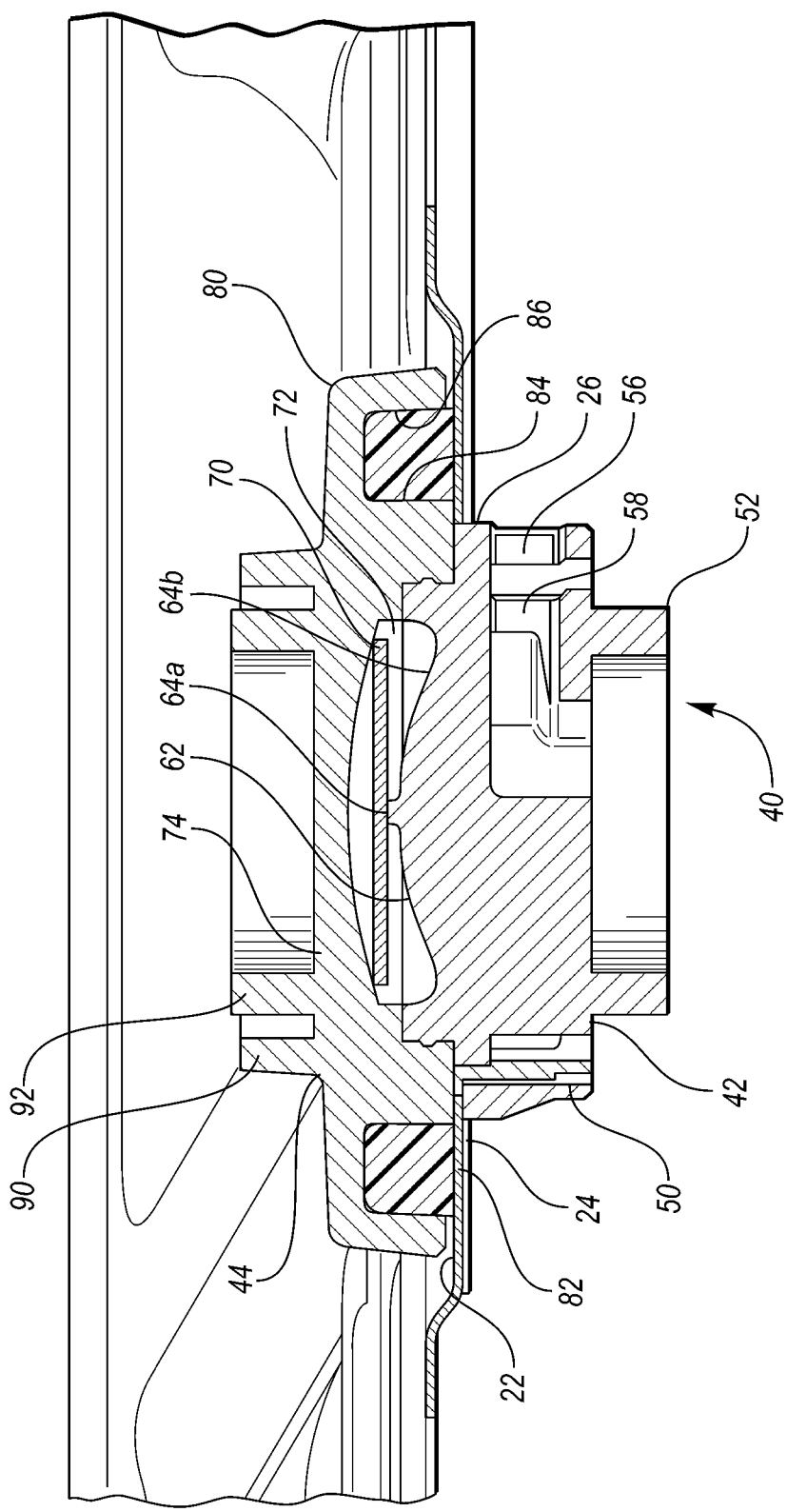
FIG. 3 is a side sectioned view a one-way valve disposed in an aperture of a storage basin of a vehicle.

As shown in FIGS. 2 and 3, a one-way valve 40 may be disposed within the aperture 26. As discussed in greater detail elsewhere herein, the one-way valve 40 may be adapted to provide for fluid management within the vehicle 10.

Figure 4:
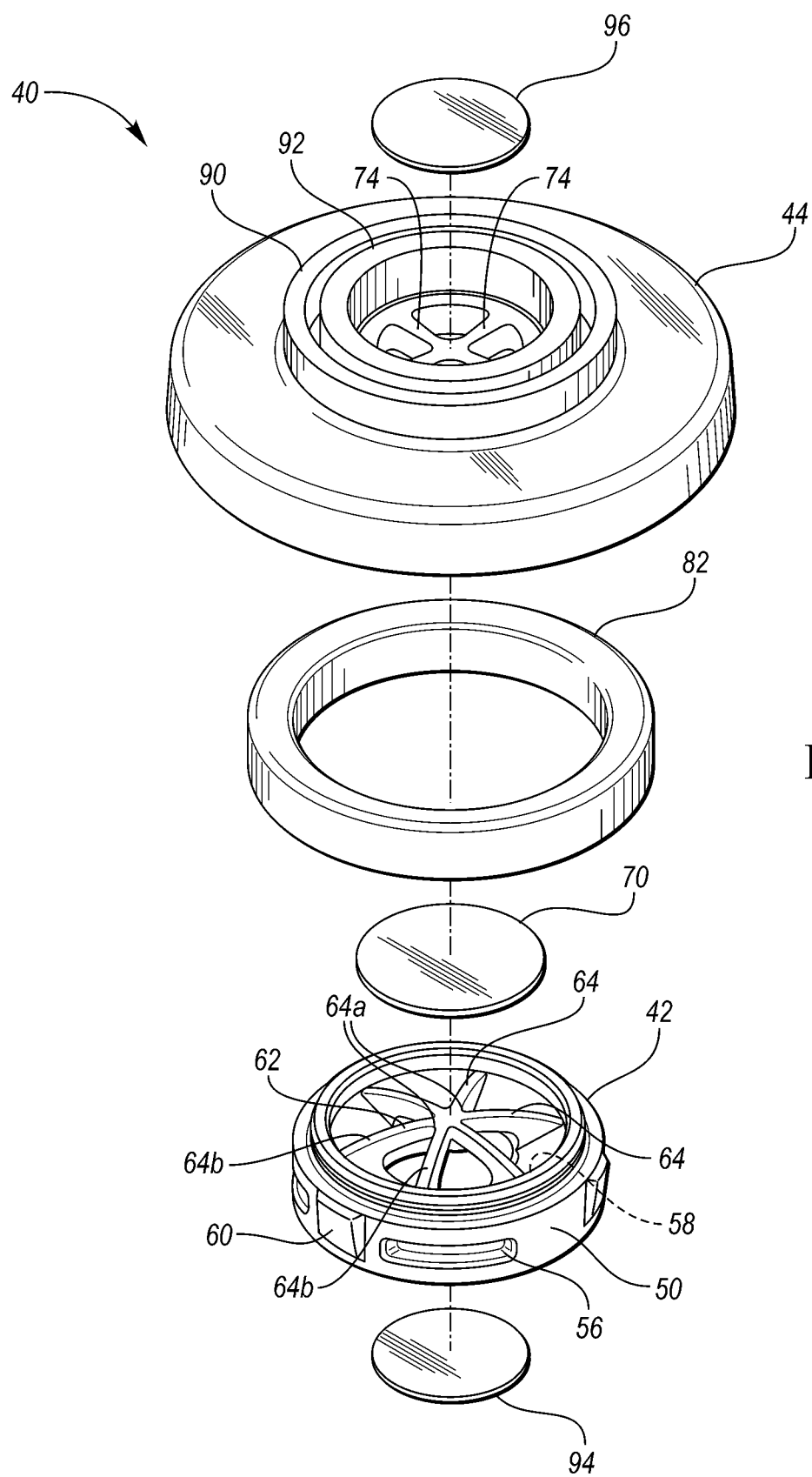
FIG. 4 is an exploded view of a one-way valve according to one approach.

Referring to FIGS. 3 and 4, the one-way valve 40 may include a base 42. The base 42 may be formed, for example, of polypropylene. The one-way valve 40 may also include a cover 44. The cover 44 may be formed, for example, of polypropylene. In at least one approach, the base 42, the cover 44, or both the base 42 and cover 44 may be a compound a polypropylene copolymer and talc (e.g., 20% talc).

In an installed configuration, the base 42 may be disposed so as to extend through the aperture 26 disposed through the basin floor 16, and the cover 44 may be disposed so as to interface the first surface 22 of the basin floor 16. In an installed configuration, the cover 44 may extend from the first surface 22 of the basin floor 16 a height in the range of approximately 10 to approximately 11 millimeters. Also in an installed configuration, the base 42 may extend from the second surface 24 of the basin floor 16 a height in the range of approximately 8 to approximately 9 millimeters. Also in an installed configuration, the one-way valve 40 may have a total height, extending from a lower edge of the base 42 to a top edge of the cover 44, in the range of approximately 19 to approximately 20 millimeters.

The base 42 may include a first ring wall 50 and a second ring wall 52. The first ring wall 50 may have a maximum outer diameter generally corresponding to the outer diameter of the aperture 26 of the storage basin 14; for example, approximately 40 millimeters. The second ring wall 52 may be disposed coaxial with the first ring wall 50, and may be at least partially disposed within the first ring wall 50. In at least one approach, at least a portion of the second ring wall 52 is concentrically disposed within at least a portion of the first ring wall 50. An outer surface of the portion of the second ring wall 52 may be radially spaced from an inner surface of the portion of the first ring wall 50.

The first ring wall 50 and the second ring wall 52 may define end faces axially offset from a central aperture of the base 42. In this way, debris may be inhibited from reaching the central aperture of the base 42.

The base 42 may be provided with redundancies to inhibited debris from blocking fluid flow through the one-way valve 40. For example, the first ring wall 50 may include one or more first apertures 56 disposed through the first ring wall 50. The second ring wall 52 may include one or more second apertures 58 disposed through the second ring wall 52. At least one second aperture 58 may be angularly offset from the first aperture 56. As used herein, the apertures may be angularly offset when they are disposed at different angular positions about a central axis passing through the longitudinal central aperture of the base 42 (e.g., through the first and second rings walls 50, 52). For example, a first aperture 56 may have a central axis extending from the longitudinal central axis of the second ring wall 52 at a first angular orientation (e.g., "3 o'clock"), and a second aperture 58 may have a central axis extending from the longitudinal central axis of the second ring wall 52 at a second angular orientation different than the first angular orientation (e.g., "6 o'clock"). In still another example, a first set of apertures 56 may have central axes extending from the longitudinal central axis of the second ring wall 52 at a first set of angular orientations (e.g., "4 o'clock," "8 o'clock," and 12 o'clock), and a second set of apertures 58 may have central axes extending from the longitudinal central axis of the second ring wall 52 at second angular orientations different than the first angular orientations (e.g., "2 o'clock," "6 o'clock," and "10 o'clock").

The first apertures 56 and the second apertures 58 may be angularly offset to provide redundancy in the fluid management system. In this way, a clogging of one of the apertures (for example, due to external debris) may not cause a complete blockage of the central aperture of the one-way valve 40.

In at least one approach, the first ring wall 50 extends a first distance in an axial direction. The second ring wall 52 may extend a second distance in the axial direction. In at least one approach, the second distance may be greater than the first distance. In this way, the second ring wall 52 may extend a greater distance from the base 42 than the first ring wall 50.

The one-way valve 40 may include at least one retention member. In at least one approach, the retention member is a snap member 60 that may be in the form of a depressible locking tab. The snap member may project outwardly from the first ring wall 50. The one-way valve 40 may, for example, include three snap members 60 project outwardly from the first ring wall 50. In the installed configuration, the snap members 60 may engage the second surface 24 of the basin floor 16. Also in the installed configuration, the cover 44 is adapted to interface the first surface 22 of the basin floor 16. In this way, the snap members 60 and the cover 44 interface the basin floor 16 to maintain the one-way valve 40 within the aperture 26 and to inhibit axial movement of the one-way valve 40 relative to the basin floor 16.

The base 42 may also define a central arching surface 62. The central arching surface 62 may include a plurality of arches 64. The arches 64 may define gaps between the individual arches 64. The individual arches 64 may define an upper region 64b and a lower region 64b.

A diaphragm 70 may be disposed on the central arching surface 62. For example, the diaphragm 70 may be disposed in contact with the upper regions 64a of the arches 64. In at least one approach, the diaphragm 70 is disposed so as to rest freely on the upper regions 64a of the arches 64. In at least one other approach, the diaphragm 70 is secured to the upper regions 64a of the arches 64. An oil or other lubricant may be provided at the diaphragm 70.

The diaphragm 70 may be adapted to flex between a rest configuration and a flexed configuration. For example, when the storage basin 14 is substantially free of fluid, the diaphragm 70 may be maintained in the rest configuration. When the rest configuration, the diaphragm 70 may be disposed in contact with the upper regions 64a of the arches 64. Also when in the rest position, the diaphragm 70 may be spaced from the lower regions 64b of the arches 64. In this way, the diaphragm 70 may have a rigidity sufficient to maintain the diaphragm 70 in a substantially horizontal plane when in the rest configuration. For example, the diaphragm 70 may be a fluorosilicone diaphragm.

In at least one approach, when fluid (or a sufficient amount of fluid) exists in the storage basin 14, the diaphragm 70 may flex to the flexed configuration. When in the flexed configuration, the diaphragm 70 may be disposed in contact with the lower regions 64b of the arches 64. In this way, fluid from the interior cavity 28 of the storage basin 14 may be expelled through the one-way valve 40.

The one-way valve 40 may further include a cover 44. In at least one approach, the cover 44 may be secured to the base 42. For example, the base 42 and the cover 44 may be secured to each other in a friction fit (e.g., snap-fit) engagement. In at least another approach, the cover 44 and the base 42 may be integrally formed.

The cover 44 may define a central aperture 72 disposed through the cover 44. The central aperture 72 may be coaxial with the second ring wall 52. In this way, fluid may be permitted to pass through the central aperture 72 and through the second ring wall 52. In at least one approach, the cover 44 includes at least one rib 74 extending across the central aperture 72. For example, the cover 44 may include two cross-wise ribs 74 intersecting at a central region of the central aperture 72.

The cover 44 may define an annular skirt region 80. The annular skirt region 80 may extend from the central aperture 72. In at least one approach, annular skirt region 80 defines the outer diameter of the cover 44. The outer diameter may be, for example, approximately 66 millimeters. In this way, the outer diameter of the cover 44 may be greater than the outer diameter of the first ring wall 50.

The one-way valve 40 may further include a seal 82. In at least one approach, the seal 82 may be a rubber gasket seal, and may be in the form of an o-ring. The seal 82 may be secured to the cover 44. In at least one approach, the seal 82 may be disposed within the annular skirt region 80. For example, the seal 82 may be friction fit (e.g., snap-fit) within the annular skirt region 80. In at least one approach, the annular skirt region 80 may define a first seal retaining wall 84 and a second seal retaining wall 86. The first seal retaining wall 84 may have a first diameter, and the second seal retaining wall 86 may have a second diameter that may be, for example, greater than the first diameter of the first seal retaining wall 84. In this approach, the seal 82 may be friction fit (e.g., snap-fit) between the first seal retaining wall 84 and the first seal retaining wall 84 of the annular skirt region 80 of the cover 44. In at least one approach, the first diameter of the first seal retaining wall 84 is greater than an outer diameter of the first ring wall 50.

In the installed configuration, the seal 82 may adapted to engage the first surface 22 of the basin floor 16. In at least one approach, the seal 82 is adapted to form a liquid-tight or substantially liquid-tight seal with the first surface 22 of the basin floor 16 about the central aperture 72, as described in greater detail elsewhere herein.

The cover 44 may include a first upstanding ring wall 90. The first upstanding ring wall 90 may be coaxial with the central aperture 72. The cover 44 may further include a second upstanding ring wall 92 that may be disposed at least partially within the first upstanding ring wall 90. The second upstanding ring wall may also be coaxial with the central aperture 72.

As shown in FIG. 4, in at least one approach, the one-way valve 40 includes one or more filters. For example, the one-way valve 40 may include a first filter 94 secured to the base 44; for example, within the second ring wall 52. The first filter 94 may be secured to the second ring wall 52, for example, through one or more welds (e.g., sonic welding). The one-way valve 40 may also include a second filter 96 secured to the cover 44 at the central aperture 72. The second filter 96 may be secured to the cover 44, for example, through one or more welds (e.g., sonic welding). One or both of the first filter 94 and the second filter 96 may be formed of nylon mesh, and may be, for example, 160 micron nylon mesh.

As described herein, the one-way valve 40 may be adapted to provide for fluid management within the vehicle 10. For example, the base 42 of the one-way valve 40 may be pressed by a machine or operator into a friction fit (e.g., snap-fit) engagement within the aperture 26. In another example, the base 42 of the one-way valve 40 may be rotated (e.g., screwed) by a machine or operator into engagement (e.g., a twist-lock engagement) within the aperture 26.

In the engaged configuration, the seal 82 may engage the first surface 22 of the basin floor 16 of the storage basin 14 to provide a liquid-tight or substantially liquid-tight seal with the first surface 22 of the basin floor 16 about the central aperture 72. When fluid (or a sufficient amount of fluid) exists in the interior cavity 28 of the storage basin 14, the weight of the fluid may cause the diaphragm 70 to flex about the central arching surface 62 to the flexed configuration. When in the flexed configuration, the diaphragm 70 may permit fluid from the interior cavity 28 of the storage basin 14 may be expelled through the one-way valve 40.

The one-way valve 40 may also be adapted to inhibit or substantially inhibit liquid from entering the interior cavity 28 of the storage basin 14 from the exterior of the vehicle 10. For example, the diaphragm 70 may interface with the cover 44 (e.g., at the ribs 74 of the cover 44) of one-way valve 40 to cover the central aperture 72 when liquid presses on the diaphragm from the exterior of the vehicle 10. Such liquid may be present due to wet conditions such as rainy weather, or when the vehicle 10 traverses wet road conditions. Such liquid may also be present when the vehicle 10 conducts a fording excursion, such as when the vehicle 10 traverses a flooded road, a stream, a river, or other body of water.

Figure 5:
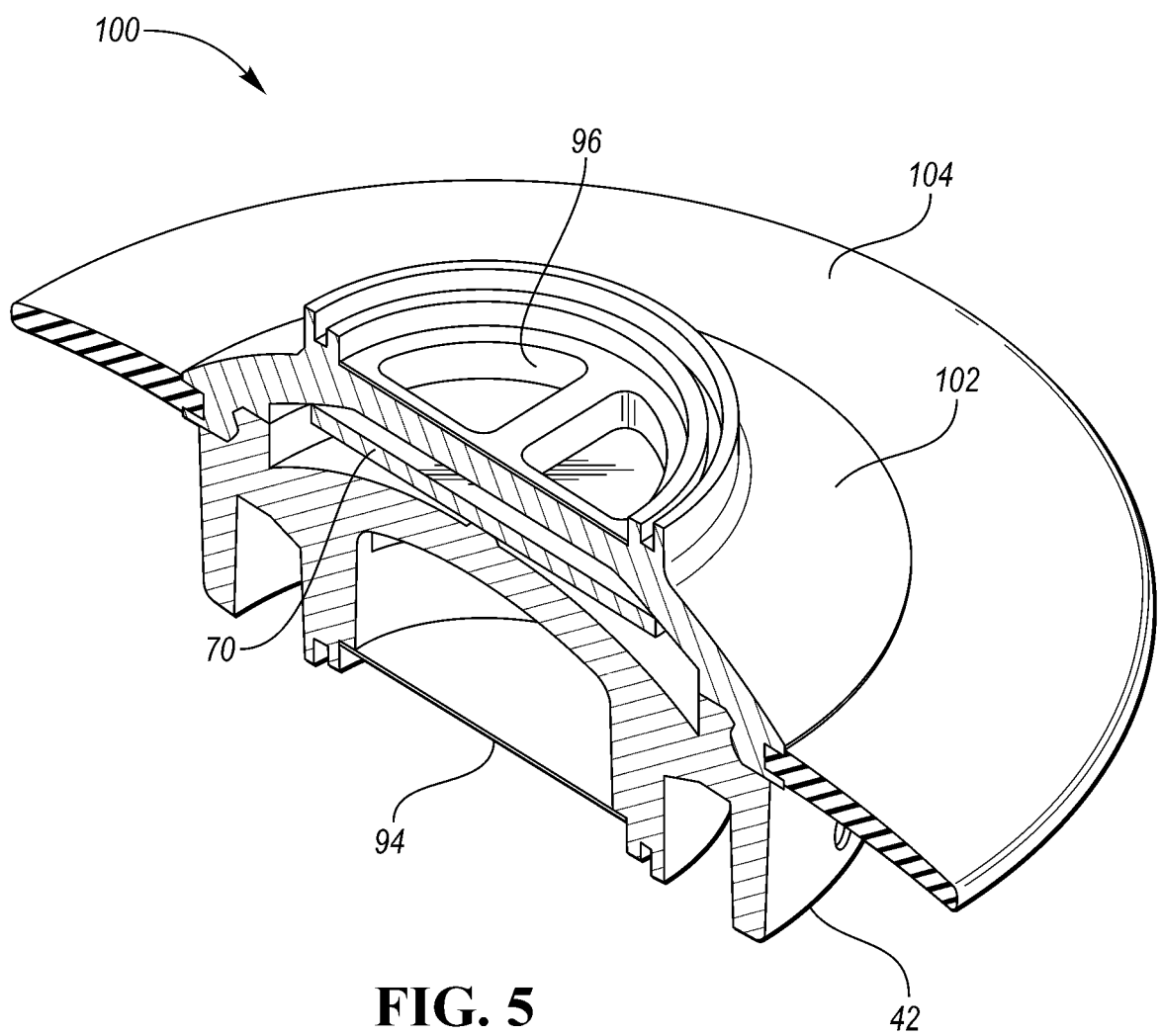
FIG. 5 is a perspective sectioned view a one-way valve according to another approach.

Referring now to FIG. 5, a one-way valve 100 according to another approach is shown. The one-way valve 100 may have a base 42, a diaphragm 70, and one or more filters 94, 96 substantially corresponding to, or similar to, those of the one-way valve 40 of FIGS. 2-4. As such, like reference numerals refer to similar elements. The one-way valve 100 of FIG. 5 may be provided with a cover 102 having a diameter generally corresponding to a diameter of the base 42. The one-way valve 100 may include a seal 104 that may be secured to the cover 102 about a perimeter of the cover 102. For example, the cover 102 and the seal 104 may be secured to each other in a friction fit (e.g., snap-fit) engagement. The seal 104 may be an umbrella seal formed of rubber. The seal 104 may be adapted to form a liquid-tight or substantially liquid-tight seal with the first surface 22 of the basin floor 16 about the central aperture 72.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A one-way valve comprising:
   a base including
      a first ring wall including a first aperture disposed therethrough,
      a second ring wall coaxial with the first ring wall and including a second aperture disposed therethrough and angularly offset from the first aperture, and
      a central arching surface;
   a diaphragm disposed on the central arching surface;
   a cover secured to the base, the cover defining an annular skirt region and a central aperture disposed therethrough coaxial with the second ring wall, the cover further including includes at least one rib extending across the central aperture; and
   a seal disposed in the annular skirt region.

2. The one-way valve of claim 1 wherein the first ring wall extends a first distance in an axial direction, and wherein the second ring wall extends a second distance in the axial direction, the second distance being greater than the first distance.

3. The one-way valve of claim 2 wherein at least a portion of the second ring wall is concentrically disposed within at least a portion of the first ring wall, and wherein an outer surface of the portion of the second ring wall is radially spaced from an inner surface of the portion of the first ring wall.

4. The one-way valve of claim 1 further comprising:
   a first filter secured within the second ring wall.

5. The one-way valve of claim 1 wherein the central arching surface includes a plurality of arches defining a gap between the plurality of arches, individual arches of the plurality of arches defining a lower region and an upper region.

6. The one-way valve of claim 5 wherein in a rest configuration, the diaphragm is disposed in contact with the upper regions of the plurality of arches and is spaced from the lower regions of the plurality of arches, and wherein in a flexed configuration, the diaphragm is disposed in contact with the lower regions of the plurality of arches.

7. The one-way valve of claim 1 further comprising:
   a snap member projecting outwardly from the first ring wall.

8. The one-way valve of claim 1 wherein the base and cover are secured in a friction fit engagement.

9. The one-way valve of claim 1 wherein the cover includes a first upstanding ring wall coaxial with the central aperture and a second upstanding ring wall coaxial with the central aperture and disposed at least partially within the first upstanding ring wall.

10. The one-way valve of claim 9 further comprising:
    a first filter secured to the cover at the central aperture.

11. The one-way valve of claim 1 wherein the cover has an outer diameter greater than an outer diameter of the first ring wall.

12. The one-way valve of claim 1 wherein the annular skirt region defines a first seal retaining wall having a first diameter and a second seal retaining wall having a second diameter greater than the first diameter.

13. The one-way valve of claim 12 wherein the seal is friction fit between the first seal retaining wall and the second seal retaining wall.

14. The one-way valve of claim 12 wherein the first diameter of the first seal retaining wall is greater than an outer diameter of the first ring wall.

15. A vehicle comprising:
    a storage basin disposed in a floor of the vehicle and having
       a basin floor defining a first surface exposed to an interior cavity and a second surface opposite the first surface exposed to an exterior of the vehicle,
       an aperture disposed through the basin floor,
    a one-way valve disposed within the aperture having
       a base including a first ring wall including a first aperture disposed therethrough, a second ring wall coaxial with the first ring wall and including a second aperture disposed therethrough and angularly offset from the first aperture, and a central arching surface,
       a diaphragm disposed on the central arching surface,
       a cover secured to the base and defining an annular skirt region,
       a seal disposed in the annular skirt region, and
       a snap member projecting outwardly from the first ring wall; and
    a high-voltage battery disposed within the storage basin and secured to the first surface above the one-way valve.

16. The vehicle of claim 15, wherein the high-voltage battery is disposed between opposing generally vertical walls of the storage basin and intersects a central axis of the aperture.

17. The one vehicle of claim 15 wherein the seal is disposed in engagement with the first surface of the basin floor, and wherein the snap member is disposed in engagement with the second surface of the basin floor to secure the one-way valve to the basin floor.

* * * * *